United States Patent Office 3,745,090
Patented July 10, 1973

3,745,090
METHOD OF DETECTING AND COUNTING BACTERIA IN BODY FLUIDS
Emmett W. Chappelle, Baltimore, and Grace L. Picciolo, Tantallon, Md., assignors to the United States of America as represented by the Administrator of the National Aeronautics and Space Administration
No Drawing. Continuation-in-part of abandoned application Ser. No. 60,950, Aug. 4, 1970. This application Apr. 30, 1971, Ser. No. 139,250
Int. Cl. C12k 1/00
U.S. Cl. 195—103.5 R            21 Claims

ABSTRACT OF THE DISCLOSURE

A novel method is provided for determining bacterial levels in urine samples, which method depends on the quantitative determination of bacterial adenosine triphosphate (ATP) in the presence of non-bacterial ATP. After the removal of non-bacterial ATP, the bacterial ATP is released by cell rupture and is measured by an enzymatic bioluminescent assay using an enzyme obtained from the firefly.

ORIGIN OF THE INVENTION

The invention described herein was made by employees of the United States Government and may be manufactured and used by or for the Government for governmental purposes without the payment of any royalties thereon or therefor.

This is a continuation-in-part of a prior copending application, Ser. No. 60,950, filed Aug. 4, 1970, now abandoned.

FIELD OF THE INVENTION

This invention relates to a method for detecting and counting the bacteria present in urine samples and to determine thereby the extent of urinary tract infections. More particularly, this invention relates to a novel method for counting bacteria which depends on the presence and determination of adenosine triphosphate (ATP) which is a nucleotide present in all known living matter.

INTRODUCTION

A rapid and routine procedure for the quantitative detection and counting of bacteria is frequently of vital importance. Classical techniques, which have the advantage of positive identification of the bacteria, are usually slow and require rather complex media. The technique described here for detecting and counting the bacteria present in a urine sample offers a high degree of sensitivity, rapidity, accuracy, and reproducibility. This inventive process exploits the high specificity and sensitivity of a bioluminescent enzymatic reaction in analysing a urine sample in conjunction with teaching a novel process for removing interfering compounds from the sample to render the bioluminescent enzymatic reaction quantitative for bacterial adenosine triphosphate.

Adenosine triphosphate, hereinafter referred to for convenience as ATP, is universally present in all living matter thereby making this compound an excellent indicator of the presence of various forms of life, e.g., bacteria. One of the most sensitive methods for the quantitative assay of ATP is an enzymatic bioluminescent assay. In this reaction, the bioluminescence occurs as a result of the reaction of ATP with an enzyme luciferase, presently obtained from fireflies, and a substrate luciferin plus divalent metal ions such as magnesium or manganese.

It has been previously demonstrated with pure cultures of a number of bacterial species that the concentration of bacterial ATP can be closely correlated with bacterial count. This is discussed in detail by E. W. Chappelle and G. V. Levin in an article entitled "Use of the Firefly Bioluminescent Reaction for Rapid Detection and Counting of Bacteria" presented in Biochemical Medicine, vol. 2, pp. 41–52 (June 1968), which article is herein incorporated by reference. By measuring the ATP content on a unit cell basis of a number of species, an average ATP content of a bacterial cell has generally been established as $3 \times 10^{-10}$ μg. (ranging from $0.28 \times 10^{-10}$ μg. to $8.9 \times 10^{-10}$ μg.).

To enable use of the ATP assay for the detection of bacteria in urine, it was necessary to develop a method for the removal of urinary non-bacterial ATP prior to the detection of the bacterial ATP. Primary sources of the urinary non-bacterial ATP are free soluble ATP and ATP in red and white blood cells. The removal of the non-bacterial ATP is accomplished by first rupturing, by a non-ionic detergent, for example, the red and white blood cells of the urine sample, thereby releasing the ATP therefrom in a free soluble state. Next, by the addition of an ATP hydrolyzing enzyme (i.e., an ATPase), all the free soluble non-bacterial ATP are hydrolyzed. The ATP hydrolyzing enzyme is then either denatured (i.e., destroyed) by heating or inactivated by a chemical means.

After removal of the non-bacterial ATP from the urine sample, the bacterial ATP is released by rupturing the bacteria with acid. Thereafter the acid is neutralized, and the pH and ionic strength of the urine sample is adjusted by a buffer for optimal luciferase activity. The urine sample, at this point of processing, will be referred to as the treated urine sample. It is combined with a luciferase-luciferin mixture, and, if bacteria are present, the light emitted from the bioluminescent reaction is detected and recorded by appropriate apparatus.

The method for determining the ATP present in the treated urine sample, is based upon a bioluminescent enzyme system, the same as that occurring in fireflies. The currently accepted reaction mechanism for this enzyme system is as follows:

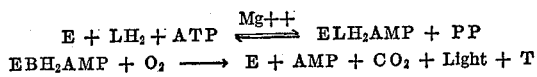

E = Firefly luciferase
LH$_2$ = Reduced luciferin
ATP = Adenosine triphosphate
AMP = Adenosine monophosphate
PP = Pyrophosphate
T = Thiazolinone
Mg$^{++}$ = Magnesium ion
CO$_2$ = Carbon dioxide
O$_2$ = Oxygen If all of the components of the above reaction are maintained in a concentration in excess of the ATP, the emission of light is directly proportional to the amount of ATP introduced. This enables one to directly relate the magnitude of light emission to ATP concentration, when the treated urine sample is combined with the luciferase-luciferin mixture, by using a standard curve prepared as fully described hereinafter. Further, should one desire to know the number of bacteria equivalent to the ATP concentration in the urine sample, it can be obtained by simply dividing the ATP concentration, based on the measure of light emission, by $3 \times 10^{-10}$ μg., the average ATP content of a bacterial cell.

DESCRIPTION OF THE PRIOR ART

Methods presently used for determining and counting bacteria in urine are: (1) culture methods which include the streak and the pour plate methods; and (2) direct methods which include microscopic counting and another method which depends upon the ability of organisms to reduce nitrates to nitrites.

The streak method is effected by streaking a small quantity of urine on a solid agar plate containing nutrients. The pour plate method is more accurate but far more time consuming since it requires serial dilutions of the urine sample to be analyzed followed by mixing precise aliquots of the dilutions with a preheated liquid bacterial nutrient containing agar. The resultant mixture is then poured into a Petri dish and solidifies as a plate upon standing. In both of the methods just described, an incubation period of from 1 to 4 days is required, after which the plates are examined for bacterial colony growth with the number of colonies being a measure of the bacterial count. Both of these methods are semiquantitative at best and do not permit the detection of non-culturable organisms which may be of interest.

Further, a considerable amount of time is required of the technician preparing the samples in addition to the necessary time required for incubation of the samples.

Although both the streak and pour plate methods of determining bacterial count give results which appear to correlate with other symptoms of urinary tract infections, they possess drawbacks. The source of these disadvantages resides in the basic requirement for bacterial growth which presents certain difficulties; one, for example, is that the incubation period, as mentioned, can vary from about 1 to about 4 days. A delay of this duration in the diagnosis of a urinary tract infection could, in some cases, be of critical significance. The validity of the culture methods can be questioned, considering the fastidious and obligate nature of many bacterial species with regard to specific nutrient and environmental requirements. Therefore, when considering that most clinical laboratories use only two types of nutrient media in the culture of urine specimens, the possibility of failing to detect certain viable organisms becomes quite real. In fact, experiments have indicated that a significant percentage of urinary bacteria are obligate anerobes. Of course, there are additional reasons for the failure of bacteria to grow such as cell death, dormancy, and the presence of bacteriostatic agents.

The direct microscopic counting method requires the deposition of precise aliquots of the urine sample on a calibrated slide. Subsequently, the slide is viewed through a microscope and the bacteria present are counted. This method suffers from many disadvantages including the time and effort expended by a skilled technician in addition to the fact that it cannot be used for the analysis of turbid samples. The direct microscopic method is generally more accurate than the culture techniques since it involves the direct counting of the bacteria rather than depending upon the ability of the bacteria to grow and form colonies. While this is a useful technique in some situations, it is entirely too tedious and time-consuming for use in a routine clinical laboratory.

SUMMARY OF THE INVENTION

Objects

Accordingly, it is a primary object of the present invention to provide an improved method for detecting and counting bacteria which substantially prevents or alleviates one or more of the disadvantages of the prior art.

Another object is to provide a method for detecting and counting bacteria utilizing a bioluminescent reaction of bacterial ATP when the sample to be analyzed also contains non-bacterial sources of ATP.

A further object is to provide a method for detecting and counting bacteria which yields more accurate results in far less time using much simpler procedures than methods of the prior art.

Another object is to provide a method for detecting and counting bacteria in urine samples utilizing the high specificity of an enzymatic reaction which method is also capable of adaptation to automatic equipment thereby lessening the expenditure of time and obviating the necessity of requiring the use of experienced personnel as is currently the practice.

These and other objects of the present invention will become apparent with reference to the following summary of the invention and the description of the preferred embodiments thereof.

According to the present invention, a method is provided for detecting and counting bacteria in a urine sample which method is capable of rupturing the various non-bacterial cells containing ATP without affecting the bacterial cells which also contain ATP; hydrolyzing the non-bacterial ATP with a suitable hydrolyzing agent followed by treatment of the sample to destroy or inactivate the hydrolyzing agent; rupturing the bacterial cells with acid to release the bacterial ATP present therein; neutralizing the acid and adjusting the pH and ionic strength of the sample to a level which will favor the reaction of ATP with a luciferase-luciferin mixture; combining the treated sample with the luciferase-luciferin mixture and measuring the amount of light emitted therefrom with appropriate equipment, a typical example of such equipment being thoroughly described in copending continuation-in-part application Ser. No. 139,094, filed concurrently herewith, and entitled Automatic Instrument for Chemical Processing to Detect Microorganisms in Biological Samples by Measuring Light Reactions.

In another aspect of the invention, the non-bacterial ATP present as a result of red or white blood cells present in the sample is removed without affecting the bacteria which contain ATP, which ATP will ultimately be quantitatively determined. After removal of the undesirable non-bacterial ATP, the bacteria are then ruptured to release the ATP therefrom, thereby making it available for quantitative determination.

DESCRIPTION OF THE INVENTION

Briefly, a method is provided for detecting and counting bacteria in urine which comprises: (a) adding a compound to a urine sample which is capable of releasing, in a free soluble state, the ATP present in non-bacterial matter contained therein without releasing the ATP contained in the bacteria present in the urine sample; (b) adding a compound capable of hydrolyzing all free soluble non-bacterial ATP; (c) treating the sample to destroy or inactivate the hydrolyzing agent; (d) acidifying the sample to rupture the bacteria and release the bacterial ATP contained therein; (e) neutralizing the acid and adjusting the pH and ionic strength to a level which will favor the bioluminescent reaction of bacterial ATP with a luciferase-luciferin mixture; (f) combining the above treated urine sample with a luciferase-luciferin mixture which contains a divalent metal cation, such as magnesium or manganese; and (g) detecting and recording the amount of light emitted from this reaction using photometric equipment of suitable sensitivity.

To use the ATP assay for the detection of bacteria in an aqueous physiological system, for example, urine, it is necessary to develop a means for the removal of non-bacterial ATP from the system. The primary sources of non-bacterial ATP in a urine sample, for example, are the free soluble ATP and the ATP contained in red and white blood cells which may also be present with other contaminants in the urine sample. The removal of the non-bacterial ATP is accomplished by rupturing the red and white blood cells to release ATP therefrom in a free soluble state, followed by the addition of an ATP hydrolyzing enzyme (i.e., ATPase) to destroy the total free soluble ATP in the urine sample. After either inactivation or denaturation (i.e., destruction) of the ATP hydrolyzing enzyme, the ATP contained in the bacteria is released, by rupture of the bacteria, and reacted with the luciferase-luciferin mixture, resulting in light emission of a magnitude proportional to the ATP concentration and therefore proportional to the bacterial count in the urine sample.

Any means may be used to rupture non-bacterial cells to release ATP therefrom providing the means is sufficiently selective to rupture only non-bacterial cells and is either not toxic or can be rendered non-toxic. That is, nothing should interfere with any subseqeunt reaction, especially the bioluminescent reaction of the bacterial ATP with the luciferase-luciferin mixture. One way of rupturing the non-bacterial cells is by a means which reduces the surface tension of the non-bacterial cells.

It has been found that certain surfactant compounds, which lower the surface tension of aqueous solutions, particularly those classified as cationic, anionic, and nonionic detergents, are generally sufficiently selective to rupture the non-bacterial cells to permit the release of the ATP therefrom without affecting the bacteria in the sample.

Although cationic and anionic detergents are usable in the process of this invention, nonionic detergents, such as octyl phenoxy polyethoxyethanol, are economical, easily obtained, perform most satisfactorily, and are therefore preferred.

Examples of some other surfactant compounds, falling within the proper category, are triterpenoid saponins, steroid, saponins, sulfosuccinates, such as dioctyl sodium sulfosuccinates, various glycosides and some polyoxyethylene derivatives of fatty acid partial esters of sorbitol anhydrides.

The rupturing of the non-bacterial cells is generally conducted at ambient temperature and ambient pressure with the urine sample being allowed to stand for from about 1 minute to about an hour, preferably from 5 to 20 minutes, and most preferably approximately 10 minutes. The amount of time the urine sample is allowed to stand, for example, when a nonionic detergent such as octyl phenoxy polyethoxyethanol, has been added to the urine sample, is partially dependent upon the temperature since the rate of rupture will be increased appreciably for each degree increase in temperature. On long standing or at elevated temperatures, however, the nonionic detergent might begin to attack the bacteria, thereby reducing the precision and accuracy of the method.

The nonionic detergent, octyl phenoxy polyethoxyethanol, when used as the rupturing agent, performs best when it is at a concentration of from about 0.05 to about 5.0 percent by volume and is added to the urine sample in an amount equivalent to approximately 5 to 15% of the volume of the urine sample.

After the non-bacterial cells containing ATP have been selectively ruptured by the octyl phenoxy polyethoxyethanol and the ATP has been released from the non-bacterial cells in a free soluble state, a compound is added to the urine sample which is capable of hydrolyzing the total free soluble ATP in the urine sample. The most specific non-toxic means of hydrolyzing ATP is by the use of ATP hydrolyzing enzymes commonly referred to as ATPases. Any ATPase may be used, for example, potato apyrase, insect apyrase, muscle ATPase, and liver ATPase. Potato apyrase, since it is more completely characterized, easily purified, easily obtained, and yields excellent results, is the preferred hydrolyzing agent for use in the practice of this invention.

After adding the ATPase, the urine sample is allowed to stand at ambient temperature and pressure for a time sufficient to allow the hydrolysis to proceed to completion. Generally, the sample is allowed to stand from about 1 to about 25 minutes, and preferably about 5 to about 15 minutes.

Once the non-bacterial ATP has been liberated and hydrolyzed with the ATPase, the hydrolyzing enzyme must be inactivated or destroyed (denaturation of the enzyme) to prevent interference with the analysis of the ATP subsequently released from the bacteria. This can be done by physical means or by chemical agents. Typical chemical agents are acid, bases, salts of heavy metals, organic solvents, and those compounds classified as enzyme inhibitors. Physical means include heat and short wavelength irradiation. It has been found that heating the urine sample for a brief period, that is, from about 1 to about 15 minutes, preferably for about 5 to 12 minutes, from 60° C. to 100° C. is effective to denature the hydrolyzing enzyme. It has also been noted that the addition of perchloric acid to the urine sample is effective in inactivating the hydrolyzing enzyme.

It is easily seen that an entire range of compounds and procedures may be used to effect the inactivation or denaturation of the hydrolyzing enzyme, requiring only that they do, in fact, destroy the activity thereof without appreciably affecting the bacterial cells or the bioluminescent reaction used to determine the bacterial ATP. Any compound used which is toxic to the luciferase-ATP reaction would ultimately have to be removed or neutralized.

The denaturation of the hydrolyzing enzyme is generally carried out at an elevated temperature, preferably 95° C., and ambient pressure; however, if it should be more convenient or necessary to carry this out at elevated pressures, there is no apparent reason for not doing so.

Although the description so far has been presented with the nonionic detergent being added to the urine sample prior to the addition of the ATP hydrolyzing enzyme, they being added sequentially, it should be understood that these two ingredients can be added simultaneously, either separately or as a mixture.

Once the potentially interfering non-bacterial ATP has been effectively removed from the urine sample and the hydrolyzing enzyme has been inactivated or denatured, the sample is cooled to ambient temperature. Then the bacterial ATP is liberated by rupturing the cell walls of the bacteria present, and the ATP so released is reacted with the luciferase-luciferin combination as indicated previously.

Many different compounds and procedures may be used to rupture the cell walls of the bacteria and liberate the bacterial ATP. These include organic acids, such as acetic and formic acid, and inorganic acids, such as perchloric acid, hydrochloric acid, sulfuric acid, phosphoric acid, and nitric acid. In addition, ultrasonic vibrations and some organic solvents, such as butanol, are effective in releasing the bacterial ATP. Again, the basic requirements for this reagent are that it rupture the bacterial walls to liberate the ATP without reacting with the ATP and without interfering with the subsequent reactions, especially the bioluminescent reaction of the ATP with the luciferase-luciferin combination.

It has been found that perchloric acid is exceptionally suitable for this step; and, after the addition of a small amount of perchloric acid at a relatively low concentration, the sample is allowed to stand for from about 10 seconds to about 15 minutes, preferably from about 1 to about 7 minutes. The reaction is rapid and does not require a great amount of time to liberate the bacterial ATP. If the sample is allowed to stand for too long a time after the perchloric acid is added, the ATP which is released from the bacteria may be adversely affected by the acid. If too much acid is used, precision of the ultimate analysis will be affected since the acid anion has an adverse effect on the bioluminescent reaction.

Although the speed of the reaction will be increased for each incremental increase in temperature, it has been found that rupturing of the bacteria is generally optimum at ambient temperature, there being no appreciable benefit at elevated temperatures which can very well work to a detriment in that the ATP could be destroyed. Further, while it is most convenient to rupture the bacteria at ambient temperatures, there is no reason why this cannot be done at temperatures down to 5° C.

In a 1.0 ml. sample of urine, wherein perchloric acid is used to release the bacterial ATP, an amount in the range of 0.05 ml. to 1.0 ml. of a 0.05 to 5.0 N perchloric acid solution can be used. An insufficient amount of acid will not rupture the cell walls of the bacteria while an excess of the acid may have an adverse effect on the ATP after it is released.

Neutralization of the acid can be effected with an organic or an inorganic base. Examples of such bases include alkali metal hydroxides and alkaline earth metal hydroxides, along with those organic compounds capable of accepting hydrogen ions without adversely affecting the bioluminescent reaction of interest here. The fundamental requirement of the base is, of course, that it be able to neutralize the acid. In addition, a preferred base will be one wherein the cation of the base will react with an interfering anion of an acid of the previous step, to form an insoluble precipitate, thereby removing harmful ions from the sample and avoiding future interferences with the analysis by these ions. This is preferred as is any other arrangement which will remove ions which may interfere with the bioluminescent reaction. This, of course, is practical from an economic standpoint also, since an additional step in the analysis is obviated, namely, the requirement that these ions be removed prior to the bioluminescent reaction.

The amount of base used may range from 0.05 ml. to 1.0 ml. of a 0.05 to 5.0 N potassium hydroxide solution. An insufficient amount of base will not effectively neutralize the acid, and an excess of the base may be harmful to the ATP released from the bacteria.

The ultimate pH and ionic strength of the sample is then adjusted with a buffer which can be added thereto either substantially at the same time the base is added or any time thereafter. The buffer serves to maintain the pH of the urine sample fairly precisely at about 7.4, which is the optimal pH for maximum activity of the luciferase-luciferin combination. If the hydrogen ion activity (pH) should become appreciably lower or appreciably higher, the ultimate precision of the analysis will suffer due to the decreased activity of the luciferase-luciferin combination. Furthermore, in the presence of a buffer, the volumes of acid and base required in the previous steps need not be quite so critical since the buffer will compensate for any minor discrepancies. Any buffer may be used which maintains the pH of the urine sample in the range of about 6.8 to 7.8 preferably 7.2 to 7.6, and most preferably, approximately 7.4, without interfering with the principal reaction. The quantity of the buffer which is added generally falls within the range of about 0.05 ml. to about 1.0 ml. at a concentration of about 2 to 2.5 M. Buffers which fulfill these requirements and can be used in the process of the instant invention include TES buffer [N-tris (hydroxymethyl) methyl - 2 - aminoethanesulfonic acid]; phosphate buffers; arsenate buffers; tris buffers, e.g. tris (hydroxymethyl) aminomethane; arsine buffers; glycyglycine buffer; and N-2-hydroxyethylpiperazine-N-2-ethanesulfonic acid buffer.

The treated urine sample, as prepared above, is then combined with the luciferase-luciferin combination containing divalent magnesium or manganese ions, and the light given off during the bioluminescent reaction is measured with appropriate instrumentation.

A complete and detailed description of an instrument which can automate the above described process, including measuring the light emitted in the bioluminescent reaction, can be found in copending continuation-in-part application, Ser. No. 139,094, filed concurrently herewith, and entitled Automatic Instrument for Chemical Processing to Detect Microorganisms in Biological Samples by Measuring Light Reactions, the disclosure of which is herein incorporated by reference.

This instrument generally includes a rotatable table having spaced receptacles therein for continually receiving vials of urine samples automatically fed thereto and for thereafter moving the vials past a plurality of dispensing means which sequentially dispense a predetermined quantity of the various ingredients, used in the process, into the vials as the vials pass the respective dispensing means. Also associated with the rotatable table are heating means, cooling means, and photodetecting means, all precisely located, as are the dispensing means, so that the proper timing sequence, as outlined above, for each operation of the process is performed. It is to be pointed out that the area in which the bioluminescence reaction takes place and whereat the photodetecting means is located, to provide a measure of the light being given off, is light tight so that the photodetecting means will only register the light from the bioluminescence reaction. Further, should it be desired to inactivate the hydrolyzing agent by chemical means, the heating means and a portion of the cooling means can be made to be inoperative.

The invention is further illustrated by the following examples in which all parts and percentages are by weight unless otherwise indicated. These examples are illustrative of results obtained with one embodiment of the invention and are provided to teach those skilled in the art how to practice the invention and to represent one mode contemplated for carrying out the invention.

EXAMPLES I—XVII

Introduction

The procedure used, in the analysis of the samples given in Table I below, involved obtaining a urine sample and treating it to remove both the ATP in free soluble state and also that in any red or white blood cells present in the sample. This was accomplished by selectively rupturing the red and white blood cells with Triton X–100 (registered trademark of the Rohm and Haas Corporation for a brand of octyl phenoxy polyethoxyethanol) and adding potato apyrase, an ATP hydrolyzing enzyme. After a short time, the urine sample was heated to approximately 95° C. to denature the potato apyrase. Thereafter, the sample was acidified with perchloric acid to rupture the bacteria and then neutralized with potassium hydroxide solution prior to adjusting the pH of the sample to approximately 7.4 with TES buffer [N-tris (hydroxymethyl) methyl-2-aminoethanesulfonic acid]. A portion of this treated urine sample was then combined, as more fully explained below, with the luciferase-luciferin combination containing divalent magnesium or manganese ions, and the light given off measured.

Treatment of urine samples (a) A 1.0 ml. sample of urine was mixed with 0.1 ml. of a 1% by volume Triton X–100 solution and a 0.1 ml. of a potato apyrase solution (described infra) and allowed to stand at ambient temperature for 10 minutes.

(b) The sample was then heated at approximately 95° C. for 10 minutes to denature the potato apyrase. After heating, the sample was allowed to cool to ambient temperature and then 0.1 ml. of 1.0 N perchloric acid was added thereto, and the sample was allowed to stand for five minutes.

(c) The perchloric acid solution was then neutralized through the addition of 0.1 ml. of a 1.0 N potassium hydroxide solution.

(d) The final pH of the sample was brought to 7.4 through addition of 0.1 ml. of 2.0 M TES buffer [N-tris (hydroxymethyl) methyl-2 - aminoethanesulfonic acid], thereby obtaining the treated urine sample.

Preparation of the luciferase-luciferin mixture

Partially purified firefly luciferase was prepared from dried firefly lanterns obtained from the Antonik Laboratories, Elk Grove, Ill., for example, in the following manner. One gram of an acetone powder, prepared from the lanterns, was mixed with 10 ml. of cold 0.05 M TES buffer and stirred 30 minutes. After centrifuging the mixture at 13,000×g for 15 minutes, the supernatant solution was placed on a Sephadex G–200 (registered trademark for dextran beads which separate compounds on the basis of molecular weight) column equilibrated with 0.05 M TES buffer at a pH of 7.4 and eluted with the same buffer. The fractions obtained from the column were assayed for luciferase activity by removing 0.2 ml. aliquots to which 0.1 ml. of the TES buffer, containing synthetic luciferin (0.1 mg./ml.) and magnesium sulfate (0.01 M) was added. Luciferase activity was measured on the basis of the light emission upon the addition of $10^{-2}$ µg. of ATP to the mixture. The most active fractions obtained from the column, based upon magnitude of light emission, were selected, pooled, and mixed with a luciferin-magnesium solution [1 part luciferase to 2 parts luciferin (0.1 mg./ml.)-magnesium sulfate (0.01 m)] and then lyophilized in 10 ml. volumes. The lyophilized mixtures were then stored at −40° C. and prepared for use as needed by the addition of 10 ml. of distilled water.

Preparation of potato apyrase

The potato apyrase was prepared by peeling and dicing 500 grams of white potatoes, adding them to 250 ml. of cool distilled water and homogenizing in a blender for 5 minutes. The suspension was then filtered through 2 layers of cheese cloth and the filtrate taken to 20% saturation with ammonium sulfate after which the pH was adjusted to approximately 4.0. Additional ammonium sulfate was then added to achieve 40% saturation, and the mixture was centrifuged at 13,000×$g$ for 15 minutes at room temperature. The precipitate was discarded, and the supernatant solution was brought to 75% saturation with ammonium sulfate. After standing 15 minutes at room temperature, the mixture was centrifuged as above. The precipitate was then dissolved in 50 ml. of distilled water. The extract was placed on a Sephadex G-100 column equilibrated with 0.01 M calcium chloride in 0.05 M TES buffer at a pH of 7.4. The resultant fractions were assayed for apyrase activity by adding 0.1 ml. aliquots of each fraction of 1 µg. of ATP, contained in 1 ml. of solution, and allowing the aliquots to stand for 5 minutes, after which the remaining ATP was measured by using the firefly luciferase assay. Active fractions were those showing a complete disappearance of ATP. These fractions were pooled, lyophilized, and stored at −40° C. At such time as they are to be used, they are reconstituted by the addition of distilled water.

Preparation of synthetic luciferin

The luciferin was prepared according to the method of White et al., as presented in the Journal of the American Chemical Society, vol. 85, pp. 337–343 (1963), which is herein incorporated by reference.

Procedure

By means of a needle and syringe, 0.1 ml. of the treated urine sample, prepared in the manner described above, was injected into a cuvette containing 0.3 ml. of the luciferase-luciferin combination containing magnesium. This was done for each of the 17 samples. In carrying out this procedure, each cuvette and a photodetecting means were positioned with respect to each other in a light tight chamber so that the light given off by the bioluminescence reaction, within the respective cuvette, could be detected by the photodetecting means and thereafter measured by a recording means, electrically coupled to the photodetecting means.

A standard curve relating the magnitude of light emission to ATP concentration was plotted as follows:

A number of 0.1 ml. samples containing known quantities of pure ATP in solution form and covering the range of from $10^{-1}$ µg. to $10^{-5}$ µg. were prepared. Each of the samples of ATP was individually injected into a separate cuvette of freshly hydrated luciferase-luciferin mixture (made in the manner described above), and the magnitude of the light emitted from each of the respective resultant luminescent reactions was measured. Both the injection of the ATP and the measurement of the emitted light were performed in the fashion identical to that just described with respect to the urine sample. For each of the 0.1 ml. samples of a known quantity of ATP, a particular light emission value was obtained. These light emission values were plotted versus the corresponding quantity of ATP to form the standard curve.

Using this standard curve, the light emission values, obtained from the 17 urine samples and measured by the recording means, were converted into ATP concentrations. It should be understood, due to daily variations in the luciferase activity, that a standard curve should be prepared each day to obtain the most accurate results.

The bacterial counts as listed in the second column of Table I below were individually calculated by dividing the ATP concentrations of each of the 17 urine samples, as obtained from the standard curve, by $3\times10^{-10}$ µg., which is the mean ATP content of a bacterial cell.

The bacterial counts obtained by the ATP method were compared with the bacterial counts obtained on the same sample using the pour plate and microscopic techniques. The third and fourth columns of Table I below list this latter data. The procedures for the pour plate and microscopic bacterial counting are generally well known and therefore not described herein.

TABLE I

Determination of the number of bacteria/ml. by various methods

| Sample: | ATP method | Pour plate | Microscopic |
|---|---|---|---|
| 1 | $8\times10^7$ | $4\times10^3$ | $6\times10^7$ |
| 2 | $8\times10^7$ | $9\times10^3$ | $7\times10^8$ |
| 3 | $7\times10^9$ | $2\times10^8$ | $2\times10^9$ |
| 4 | $9\times10^9$ | $2\times10^7$ | $2\times10^8$ |
| 5 | $4\times10^8$ | $3\times10^5$ | $8\times10^7$ |
| 6 | $7\times10^8$ | $1\times10^4$ | $2\times10^7$ |
| 7 | $4\times10^7$ | $1\times10^7$ | $2\times10^8$ |
| 8 | $3\times10^7$ | $2\times10^7$ | $4\times10^8$ |
| 9 | $5\times10^9$ | $3\times10^5$ | $1\times10^8$ |
| 10 | $3\times10^7$ | (*) | $2\times10^7$ |
| 11 | $8\times10^7$ | (*) | $2\times10^7$ |
| 12 | $6\times10^7$ | $2\times10^7$ | $3\times10^8$ |
| 13 | $2\times10^8$ | $8\times10^4$ | $2\times10^7$ |
| 14 | $4\times10^7$ | | $4\times10^7$ |
| 15 | $5\times10^8$ | $3\times10^7$ | $7\times10^8$ |
| 16 | $3\times10^7$ | (*) | $2\times10^7$ |
| 17 | $1\times10^7$ | $2\times10^3$ | $1\times10^9$ |

*Indicates that no organisms grew.

Table I above illustrates results obtained with the method of the instant invention as used to determine bacterial concentration in urine samples as compared with two other methods currently in use. Of the other two methods, namely the pour plate method and microscopic method, the microscopic method is generally more accurate. A comparison of the values obtained using the ATP method as against the pour plate method indicate that the ATP method is far more accurate than the pour plate method, which also suffers by being more time consuming and extremely laborious. It can be seen from an inspection of Table I that the ATP method more closely correlates with the microscopic method whereas the pour plate method varies by as much as 6 orders of magnitude.

While not presented in tabular form, urine specimens from 700 patients at the Johns Hopkins Hospital were assayed for bacteria and the results compared with those obtained by the pour plate technique. In all cases where the colony count exceeded 10,000 per ml. by the pour plate culture, the ATP response was positive. Moreover, in most instances, the bacterial count obtained by the ATP assay was much higher than that obtained by the colony count. In fact, in a significant number of cases, where the ATP assay was positive, the colony count was negative. The possible explanations for these discrepancies have been described earlier.

ALTERNATIVE EMBODIMENT

Although the process thus far described includes the steps of heat denaturing the ATP hydrolyzing enzyme ATPase (potato apyrase solution), followed by cooling the urine sample to ambient temperature, it should be pointed out that these steps, as well as the step of neutralizing the perchloric acid through the addition of the base (potassium hydroxide solution), can be omitted if not more than ten seconds elapses between the addition of the buffer and the addition of the luciferase-luciferin mixture. This requirement can readily be fulfilled by an automated instrument. In this situation, the acid (perchloric acid) is added to the urine sample after there has been approximately 10 minutes incubation period of the Triton X-100 and potato apyrase solution that are already contained in the urine sample. The perchloric acid, in this instance, both inactivates the hydrolyzing enzyme and ruptures any bacteria present. Again, as in the earlier described process, the urine sample, with the perchloric acid added, is allowed to stand for five minutes and the urine sample brought to a final pH of 7.4 through the addition of a buffer, in this case a tris buffer, preferably 2.5 M tris (hydroxymethyl) aminomethane, thereby obtaining the treated urine sample which is then immediately mixed with the luciferase-luciferin combination containing magnesium.

A number of urine samples were tested using this alternative process. The results obtained are given in Table II along with those obtained by conventional microscopic and pour plate methods used in analysing the same samples. It can be observed that comments given above for Table I apply equally as well to Table II.

TABLE II

Determination of the number of bacteria/ml. by various methods

| Sample: | Alternative ATP method | Pour plate | Microscopic |
|---|---|---|---|
| 1 | $2.8 \times 10^6$ | $1 \times 10^5$ | $2.4 \times 10^4$ |
| 2 | $7.4 \times 10^5$ | $2 \times 10^5$ | $1 \times 10^5$ |
| 3 | $2.3 \times 10^6$ | $1 \times 10^2$ | $1 \times 10^5$ |
| 4 | $6.6 \times 10^5$ | $1 \times 10^2$ | $2.3 \times 10^7$ |
| 5 | 0 | (*) | 0 |
| 6 | $6 \times 10^5$ | $1 \times 10^2$ | $2 \times 10^4$ |
| 7 | $6.6 \times 10^7$ | $4 \times 10^7$ | $6 \times 10^7$ |
| 8 | 0 | (*) | 0 |
| 9 | $2 \times 10^6$ | $1 \times 10^2$ | $2 \times 10^4$ |

*Indicates that no organisms grew.

Processing urine samples utilizing the alternative embodiments (a) A 1.0 ml. sample of urine was mixed with 0.1 ml. of a 1% by volume Triton X-100 solution and 0.1 ml. of a potato apyrase solution and allowed to stand at ambient temperature for 10 minutes.

(b) Next 0.1 ml. of 1.0 N perchloric acid was added and the sample allowed to stand for five minutes. In this instance the perchloric acid both inactivated the potato apyrase (hydrolyzing enzyme) and ruptured the bacteria present to release the ATP therefrom.

(c) Then the final pH of the sample was brought to 7.4 through addition of 0.1 ml. of 2.5 M tris (hydroxymethyl) aminomethane (a tris buffer), thereby obtaining the treated urine sample.

(d) Immediately 0.1 ml. of the treated urine sample was injected into a cuvette containing 0.3 ml. of the luciferase-luciferin combination containing magnesium, the cuvette being positioned adjacent to a photodetecting means in a light tight chamber so that the light given off by the bioluminescent reaction could be detected by the photodetecting means and thereafter measured by a recording means electrically coupled to the photodetecting means.

The above steps a-d were repeated for each urine sample.

GENERAL COMMENTS

The method of the instant invention, as disclosed herein, results in a saving of a considerable amount of time when compared with methods of the prior art since no incubation period is required during which the bacteria grow on the nutrient substrate. Furthermore, this analysis can be conducted by non-microbiologists, and the more highly skilled personnel can be utilized more effectively.

The test is suitable for all bacteria, living or dead; it is not limited to those capable of aerobic growth; it is independent of the type of nutrient required by the bacteria for proper growth; and it is generally unaffected by the presence of bacteriostatic agents which inhibit growth.

The method is not only suitable for use in analyzing urine samples to determine urinary tract infections by measuring the level of bacteria, but it is also adaptable to the determination of bacterial levels in other aqueous body fluids such as lymph fluid, plasma, blood, spinal fluid, saliva, and mucus, to name only a few. Further, it is particularly applicable to measuring bacterial levels in aqueous body fluids which have, in addition to the bacteria, both free soluble ATP and non-bacterial cells containing ATP.

The principles, preferred embodiments, and modes of operation of the present invention have been described in the foregoing specification. The invention which is intended to be protected herein, however, is not to be construed as limited to the particular forms disclosed since these are to be regarded as illustrative rather than restrictive. Variations and changes may be made by those skilled in the art without departing from the spirit of the present invention.

For example, when the invention is performed in the automated instrument, referred to above, rather than starting with 1.0 ml. of urine sample, which after being treated, has 0.1 ml. of the treated sample injected into a cuvette containing the luciferase-luciferin mixture; the plurality of vials fed to the rotatable table each contain 0.1 ml. of urine sample and each of the ingredients are added thereto sequentially in a particular timing sequence has the luciferase-luciferin mixture injected therein. This is in contrast to the general method described in which the sample is injected into the cuvette containing the luciferase-luciferin mixture.

What is claimed is:

1. A method of detecting and counting bacteria in a urine sample which contains bacterial and non-bacterial cells containing adenosine triphosphate comprising:
   (a) treating said urine sample by rupturing the non-bacterial cells to release adenosine triphosphate present in the non-bacterial cells without rupturing the bacterial cells;
   (b) enzymatically hydrolyzing the non-bacterial adenosine triphosphate;
   (c) removing the hydrolyzing agent;
   (d) rupturing the bacterial cells, thereby releasing adenosine triphosphate;
   (e) adjusting the hydrogen ion concentration of the sample to a level favorable to a bioluminescent reaction of adenosine triphosphate and a luciferase-luciferin mixture to form a treated urine sample;
   (f) combining the treated urine sample with a luciferase-luciferin mixture which mixture also contain a divalent metal cation selected from the group consisting essentially of magnesium and manganese; and
   (g) recording the amount of light emitted therefrom.

2. The method of claim 1 wherein:
   (a) rupturing the non-bacterial cells containing adenosine triphosphate is accomplished by a compound which reduces surface tension sufficiently to release the non-bacterial adenosine triphosphate;
   (b) hydrolyzing said non-bacterial adenosine triphosphate is done with an adenosine triphosphate hydrolyzing enzyme;
   (c) removing the hydrolyzing enzyme is carried out by heat denaturation;
   (d) rupturing the bacterial cells is performed by acidifying the sample; and which further includes the step of:

(e) neutralizing the acidified sample with a suitable base prior to adjusting the hydrogen ion concentration of the sample to the level which will favor the bioluminescent reaction of the adenosine triphosphate with the luciferase-luciferin mixture.

3. The method of claim 2 wherein the sample is heated to a temperature in excess of 60° C. for time sufficient to insure the denaturation of the hydrolyzing enzyme; and the hydrogen ion concentration of the neutralized sample is adjusted with a buffer solution to form the treated urine sample with a pH of about 6.8 to about 7.8.

4. The method of claim 2 wherein:
(a) acidifying is achieved with an acid selected from the group consisting essentially of perchloric acid, hydrochloric acid, sulfuric acid, acetic acid, phosphoric acid, and nitric acid;
(b) neutralizing is accomplished with a base selected from the group consisting essentially of alkali metal hydroxides and alkaline earth metal hydroxides; and
(c) adjusting the hydrogen ion concentration is carried out with a buffer which maintains a pH of from about 6.8 about 7.8.

5. A method of detecting and counting bacteria in a urine sample which contains bacterial and non-bacterial cells containing adenosine triphosphate comprising:
(a) treating said urine sample by rupturing the non-bacterial cells to release adenosine triphosphate present therein without rupturing the bacterial cells;
(b) hydrolyzing the non-bacterial adenosine triphosphate with a hydrolyzing enzyme and allowing the mixture to stand for a time sufficient to effect the hydrolysis;
(c) acidifying the sample to rupture the bacterial cells;
(d) neutralizing said sample with an appropriate base;
(e) adjusting the hydrogen ion concentration with a buffer to form a treated urine sample which maintains a pH of from about 6.8 to about 7.8;
(f) combining the treated urine sample with a luciferase-luciferin mixture containing a divalent metal cation selected from the group consisting essentially of magnesium and manganese; and
(g) recording the amount of light emitted therefrom.

6. The method of claim 5 wherein:
(a) the non-bacterial cells containing adenosine triphosphate are ruptured by a non-ionic detergent;
(b) the adenosine triphosphate hydrolyzing enzyme is an ATPase;
(c) the sample is heated from 60° C. to 100° C. for from about 1 to about 15 minutes to denature the apyrase;
(d) the sample is acidified with an inorganic acid to rupture the bacterial cells;
(e) the sample is neutralized with an alkali metal base; and
(f) the hydrogen ion concentration is adjusted using a buffer maintaining a pH from about 7.0 to about 7.6.

7. The method of claim 6 wherein the non-ionic detergent is octyl phenoxy polyethoxyethanol, the ATPase is potato apyrase solution, the inorganic acid is perchloric acid, and the alkali metal base is potassium hydroxide.

8. The method of claim 7 wherein:
(a) the octyl phenoxy polyethoxyethanol is at a concentration of about 0.05 to about 5.0 percent by volume and is added to the sample in an amount equivalent to approximately 5 to 15 percent of the volume of said sample;
(b) an amount of the potato apyrase solution is added to provide an excess over that required for the hydrolysis of the non-bacterial adenosine triphosphate and the sample is allowed to stand for a time sufficient to effect the rupturing and hydrolysis;
(c) the sample is heated at 95° C. from about 5 to about 15 minutes to insure denaturation of the potato apyrase;
(d) the sample is acidified with the perchloric acid in a concentration of from 0.05 to 5.0 N and allowed to stand for from about 10 seconds to about 15 minutes to insure the bacterial rupture;
(e) said perchloric acid is neutralized with potassium hydroxide in a concentration of from 0.05 to 5.0 N such that potassium ions form an insoluble precipitate with the perchlorate ions; and
(f) the hydrogen ion concentration is adjusted with a non-interfering buffer which maintains a pH of from about 7.2 to about 7.6.

9. The method of claim 8 wherein:
(a) 0.1 ml. of a 1 percent solution by volume of octyl phenoxy polyethoxyethanol is added to 1.0 ml. of the urine sample and 0.1 ml. of a potato apyrase solution is combined therewith, the sample being allowed to stand at ambient temperature for from about 3 to about 20 minutes;
(b) the perchloric acid solution is neutralized with potassium hydroxide and the hydrogen ion concentration is adjusted using N-tris (hydroxymethyl) methyl-2-aminoethanesulfonic acid; and
(c) 0.1 ml. of the treated urine sample is then added to a luciferase-luciferin mixture containing magnesium.

10. The method of claim 8 wherein:
(a) 0.1 ml. of a 1 percent solution by volume of octyl phenoxy polyethoxyethanol is added to 1.0 ml. of the urine sample and 0.1 ml. of a potato apyrase solution is combined therewith, the sample being allowed to stand at ambient temperature for from about 5 to about 20 minutes;
(b) the sample is heated at 95° C. for from about 8 to 12 minutes to insure denaturation of the potato apyrase;
(c) the sample is acidified with about 0.1 ml. of 1.0 N perchloric acid and allowed to stand at ambient temperature for approximately 5 minutes;
(d) the perchloric acid solution is neutralized by adding 0.1 ml. of a 1.0 N solution of potassium hydroxide;
(e) the hydrogen ion concentration is adjusted to maintain the pH at about 7.4 by adding 0.1 ml. of 2 M N-tris (hydroxymethyl) methyl-2-aminoethanesulfonic acid; and
(f) 0.1 ml. of the treated urine sample is then added to 0.3 ml. of a luciferase-luciferin mixture containing magnesium.

11. A method of detecting and counting bacteria in a urine sample which contains bacterial and non-bacterial cells containing adenosine triphosphate comprising:
(a) treating said urine sample to remove the non-bacterial adenosine triphosphate present in said sample by enzymatic hydrolysis without affecting the bacterial cells;
(b) releasing the bacterial adenosine triphosphate present in the sample;
(c) adjusting the hydrogen ion concentration of the sample to a level favorable to a bioluminescent reaction of adenosine triphosphate with a luciferase-luciferin mixture, thereby forming a treated urine sample;
(d) combining the treated urine sample with the luciferase-luciferin mixture, which mixture also contains a divalent metal cation selected from the group consisting essentially of magnesium and manganese; and
(e) detecting the amount of light emitted therefrom.

12. A method of removing non-bacterial adenosine triphosphate present in an aqueous body fluid containing both non-bacterial and bacterial cells, said method comprising the steps of:
(a) treating said aqueous body fluid by rupturing the non-bacterial cells to release adenosine triphosphate present in the aqueous body fluid without affecting the bacterial cells;
(b) enzymatically hydrolyzing the non-bacterial adenosine triphosphate; and
(c) inactivating the hydrolyzing agent.

13. The method of claim 12 wherein:
(a) the non-bacterial cells containing adenosine triphosphate are ruptured by a non-ionic detergent;
(b) the hydrolyzing is performed by an ATPase; and
(c) the inactivation is carried out from about 1 to about 15 minutes at a temperature from about 60° C. to about 100° C.

14. The method of claim 12 wherein:
(a) the non-bacterial cells containing adenosine triphosphate are ruptured by a non-ionic detergent;
(b) the hydrolyzing is performed by an ATPase; and
(c) the inactivating is performed by an acid.

15. A method of detecting and counting bacteria in a urine sample which contains bacterial and non-bacterial adenosine triphosphate comprising the steps of:
(a) treating said urine sample to effect the removal of non-bacterial adenosine triphosphate present in said sample in both non-bacterial cells and in its free soluble state by enzymatic hydrolysis without affecting the bacterial cells;
(b) treating the urine sample to effect the release of the adenosine triphosphate from the bacterial cells present in the urine sample;
(c) adjusting the hydrogen ion concentration of the sample to a level favorable to a bioluminescent reaction of adenosine triphosphate and luciferase-luciferin mixture to form a treated urine sample;
(d) combining the treated urine sample with a luciferase-luciferin mixture, which mixture also contains a divalent metal cation selected from the group consisting essentially of magnesium and manganese;
(e) recording the amount of light emitted therefrom.

16. The method of claim 15 wherein the removal of the non-bacterial adenosine triphosphate present in the sample in both non-bacterial cells and in its free soluble state is accomplished by:
(a) rupturing the non-bacterial cells to release the adenosine triphosphate present therein, and
(b) hydrolyzing the non-bacterial adenosine triphosphate with a hydrolyzing enzyme and allowing the mixture to stand for a time sufficient to effect hydrolysis; and the release of the adenosine triphosphate from the bacterial cells in the sample is accomplished by:
acidifying the sample to inactivate the hydrolyzing enzyme and rupture the bacterial cells.

17. The method of claim 16 wherein rupturing the non-bacterial cells is performed by a non-ionic detergent, hydrolyzing the non-bacterial adenosine triphosphate is performed by an ATPase, acidifying the sample is performed by an inorganic acid, and the hydrogen ion concentration is adjusted to a pH from about 7.0 to about 7.6 by a buffer agent.

18. The method of claim 17 wherein the non-ionic detergent is octyl phenoxy polyethoxyethanol, the ATPase is potato apyrase solution, the inorganic acid is perchloric acid, and the buffer agent is a tris buffer.

19. The method of claim 18 wherein:
(a) the octyl phenoxy polyethoxyethanol is at a concentration of about 0.05 to about 5.0 percent by volume and is added to the sample in an amount equivalent to approximately 5 to 15 percent by volume of said sample;
(b) the amount of the potato apyrase solution is added to provide an excess over that required for the hydrolysis of the non-bacterial adenosine triphosphate and the sample is allowed to stand for about 3 to 20 minutes;
(c) the sample is acidified with the perchloric acid in a concentration of from 0.05 to 5.0 N and allowed to stand for 3 to 10 minutes to insure inactivation of the hydrolyzing enzyme and rupturing of the bacterial cells;
(d) and the hydrogen ion concentration is adjusted with tris buffer 2.5 M tris (hydroxymethyl) aminomethane to maintain the pH of from 7.2 to 7.6.

20. The method of claim 19 wherein:
(a) 0.1 ml. of a 1 percent solution by volume of octyl phenoxy polyethoxyethanol is added to 1.0 ml. of the urine sample and 0.1 ml. of potato apyrase solution is combined therewith, the sample being allowed to stand for about 5 to about 20 minutes;
(b) the potato apyrase solution is inactivated and the sample is acidified with about 0.1 ml. of 1.0 N perchloric acid, the sample being allowed to stand for approximately 10 minutes;
(c) the hydrogen ion concentration is adjusted to maintain the pH at about 7.4 by adding 0.1 ml. of 2.5 M tris (hydroxymethyl) aminomethane; and
(d) 0.1 ml. of the treated urine sample is immediately added to 0.3 ml. of a luciferase-luciferin mixture containing magnesium.

21. A method of detecting and counting bacteria in an aqueous body fluid which contains both non-bacterial and bacterial cells containing adenosine triphosphate and also including adenosine triphosphate in its free soluble state comprising the steps of:
(a) treating said aqueous body fluid to effect removal of non-bacterial adenosine triphosphate present in said aqueous body fluid in both non-bacterial cells and in its free soluble state by enzymatic hydrolysis without affecting the bacterial cells;
(b) treating the aqueous body fluid to effect the release of the adenosine triphosphate from the bacterial cells present therein;
(c) adjusting the hydrogen ion concentration of the aqueous body fluid to a level favorable to a bioluminescent reaction of adenosine triphosphate and luciferase-luciferin mixture to form a treated aqueous body fluid;
(d) combining the treated aqueous body fluid with a luciferase-luciferin mixture, which mixture also includes a divalent metal cation selected from the group consisting essentially of magnesium and manganese; and
(e) recording the amount of light emitted therefrom.

References Cited

UNITED STATES PATENTS

| | | | |
|---|---|---|---|
| 3,637,655 | 1/1972 | Clendenning | 195—103.5 R |
| 3,616,253 | 10/1971 | D'Eustachio | 195—103.5 R |
| 3,520,658 | 7/1970 | Anyanwu | 23—230 B |

ALVIN E. TANENHOLTZ, Primary Examiner